Figure 1:
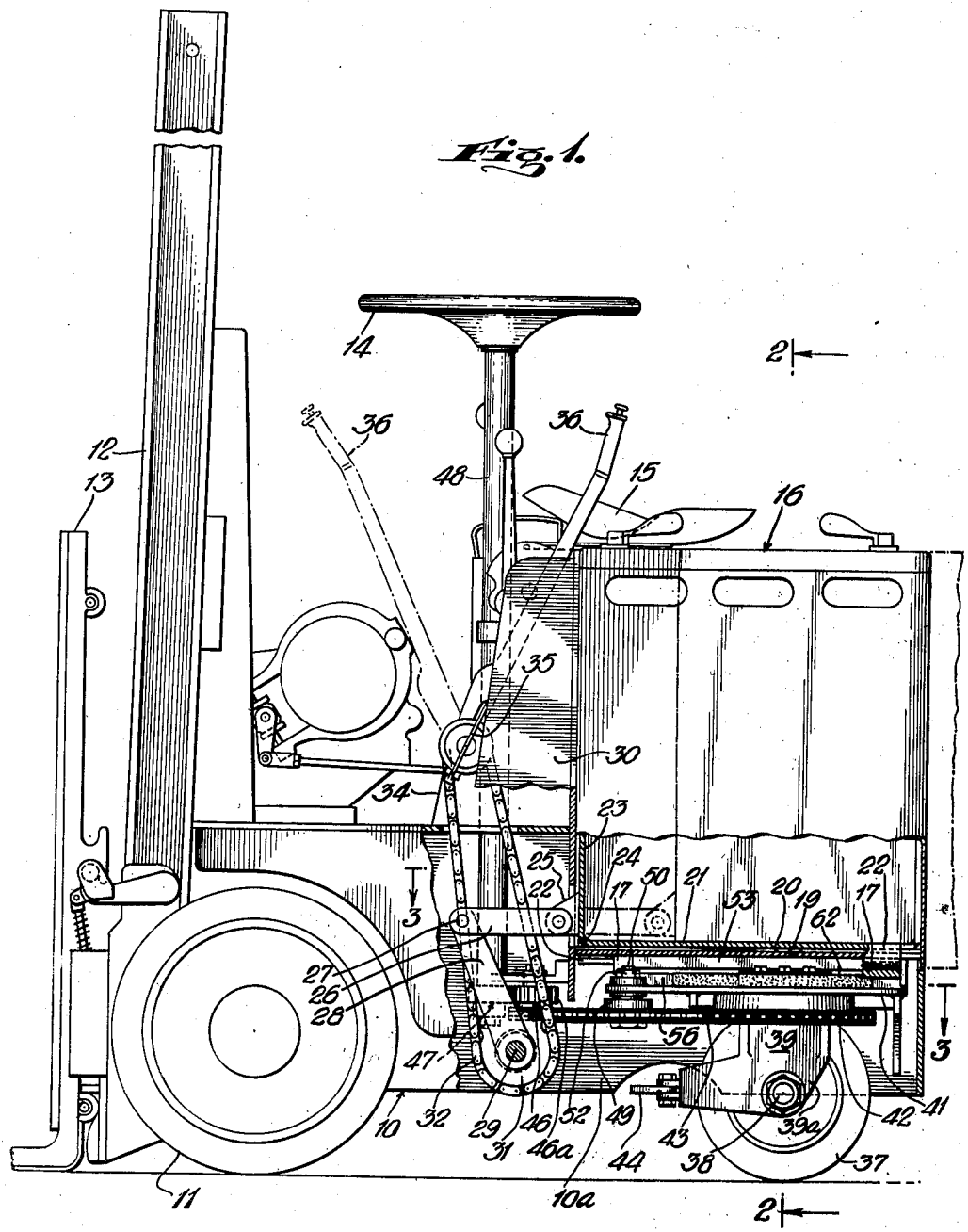

Oct. 12, 1943.   C. S. SCHROEDER   2,331,734
INDUSTRIAL TRUCK
Filed Aug. 3, 1940   3 Sheets-Sheet 2

INVENTOR
CHARLES S. SCHROEDER
BY
*[signature]*
ATTORNEY

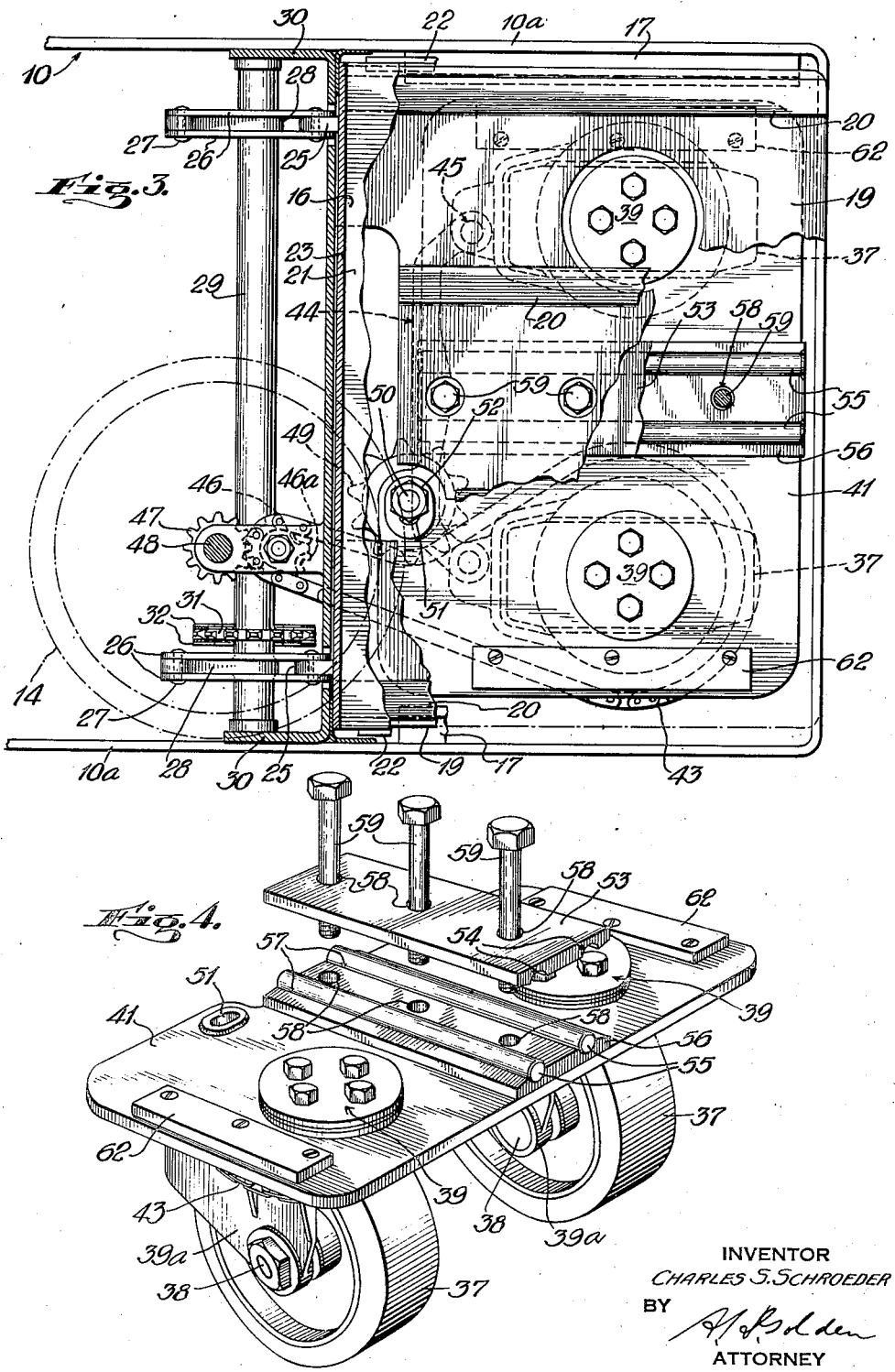

Patented Oct. 12, 1943

2,331,734

UNITED STATES PATENT OFFICE 2,331,734

INDUSTRIAL TRUCK

Charles S. Schroeder, Philadelphia, Pa., assignor to The Yale & Towne Manufacturing Company, Stamford, Conn., a corporation of Connecticut Application August 3, 1940, Serial No. 350,723

4 Claims. (Cl. 280—111)

This invention relates to an industrial truck. More particularly, my invention relates to means whereby an industrial truck is stabilized for handling heavy loads.

As a feature of my invention, I utilize a novel form of wheel supporting mechanism whereby the wheels may move to compensate for irregularities in the floor or ground, while the effective width or tread of the truck is increased beyond the actual width or tread, so as to contribute considerably greater stability to the truck. Thus, I utilize supporting wheels which are pivoted relatively to the main frame of the truck but with the axis of pivoting being changeable automatically so as to increase the distance between the pivot axis and each of the wheels.

More in detail, this feature of my invention preferably comprises a wheel supporting member maintained in bearing relation to the main frame through the medium, preferably, of a pair of longitudinal bearing shafts, the wheel supporting member pivoting about one of the shafts relatively to the main frame, or about the other of the shafts, depending upon the direction in which it pivots.

As still a further feature of the invention, I utilize a unique means for assembling the wheel supporting member relatively to the main frame so as to allow pivoting movement thereof relatively to the main frame, and to resist this pivoting movement through suitable springs.

As an additional feature of my invention, I utilize a moving power element, which in this particular case is a battery mounted in a compartment. In industrial trucks of the type for which my invention is particularly adapted, the load is frequently carried on forks or other means overhanging one end of the truck, and it therefore becomes necessary to counter balance the overhanging load. This I do in my invention by moving the power carrying unit, or battery in this case, relatively to the truck so as, in effect, to lengthen the truck and to utilize the relatively heavy battery as a counter balance for the load. The means whereby I move the battery carrying compartment are preferably mounted on the main frame, and are extremely novel and form an important part of my invention.

I have thus described generally the more important features of my invention in order that the scope and nature of my contribution to the art may be better understood. There are, of course, other features of my invention which I shall hereinafter describe and claim. While I shall now show and describe a particular preferred form of my invention, it should be understood that I deem myself entitled to a patent monopoly which will prevent the utilization of my contribution in physical forms other than those by me described herein.

Figure 2:
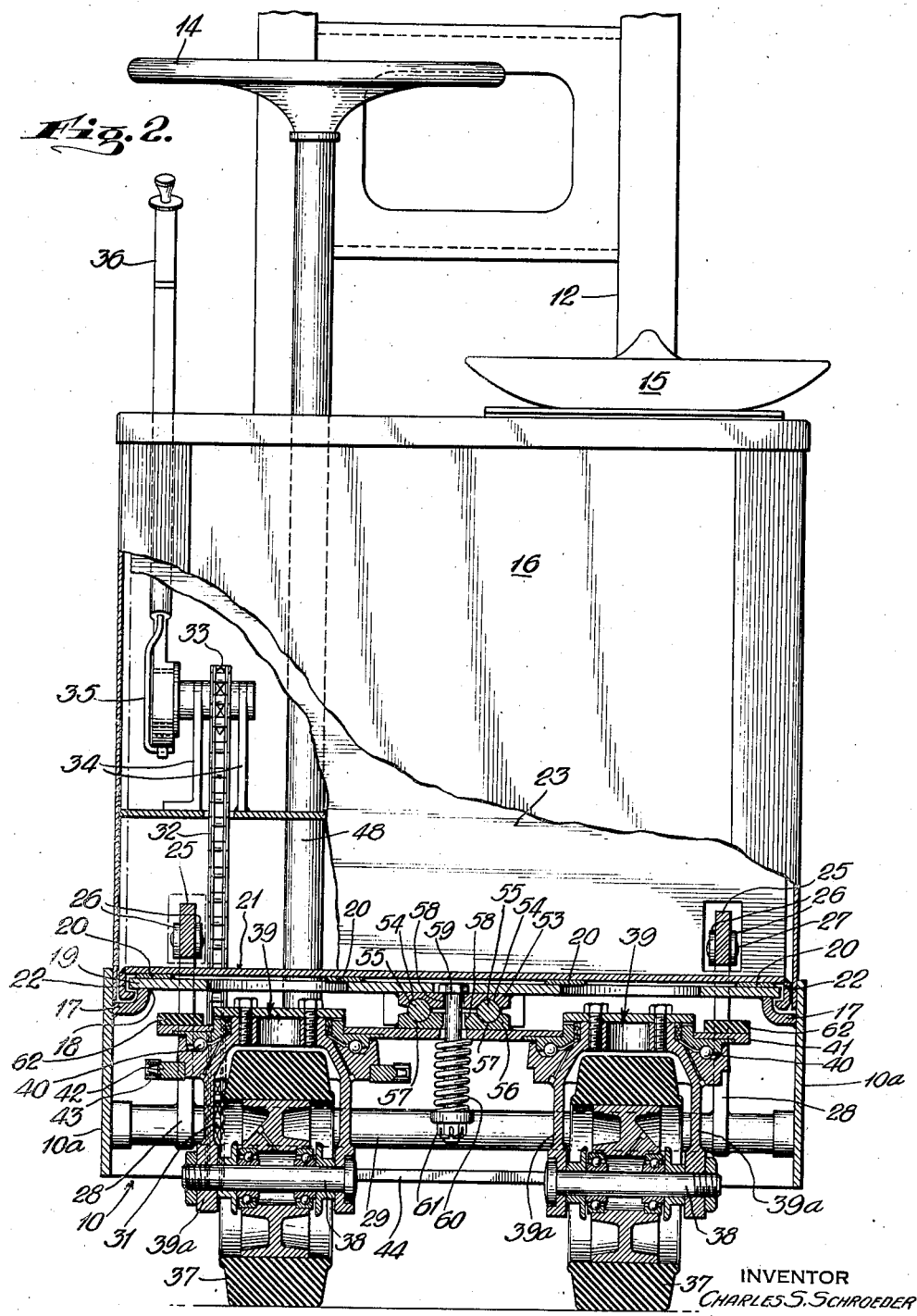

Referring now to the drawings wherein is shown a preferred form of my invention, Fig. 1 is an elevation and partial section of an industrial truck in which my invention is embodied. Fig. 2 is a section taken substantially along lines 2—2 of Fig. 1. Fig. 3 is a section taken along lines 3—3 of Fig. 1. Fig. 4 is a perspective view of the rear wheel supporting member or plate, together with the bearings, whereby the wheel supporting member or plate is supported relatively to the main frame.

Referring now more particularly to the drawings, and especially to Fig. 1, reference numeral 10 indicates the main frame of a truck having forward load supporting wheels 11 and a pair of vertical standards 12 on which are carried load forks 13 for elevating a load, all in a manner well understood by those skilled in the art.

At the center of the truck there is maintained in position a steering wheel 14 adapted to be operated by an operator who occupies the seat 15, which seat is suitably mounted so as to swing clear of a movable battery compartment 16 which contains the storage battery for operating the truck. In some trucks, this battery compartment may be a gas-electric or other type of unit, all as will be appreciated by those skilled in the art.

As will be best seen from Fig. 2, side bars 10a of the main frame 10 of the truck have welded thereto angle members 17, which in turn are welded as at 18 to what I term a main frame plate 19. This main frame plate 19 carries a series of longitudinal bearing bars 20, shown in cross section in Fig. 2, and it is on these bearing bars 20 that the bottom plate 21 of the battery compartment 16 slides. This bottom plate 21 has further extending therefrom complementary downwardly depending flanges 22 which cooperate with the ends of the main frame plate 19 for guiding the bottom plate 21 of the battery compartment relatively to the main frame, all as will be well understood from the drawings.

Referring back once again to Fig. 1, it will be noted that the battery compartment has a front plate 23 which is welded to the bottom plate 21 as at 24, and to suitable side plates of the battery compartment which need not here be designated. Welded in turn to this front plate 23, at each side thereof, are ears 25 which can be seen in Fig. 3.

Pivoted to each of these ears is a bifurcated link member 26 which is pivoted at 27 to a crank 28. Each of the cranks 28 is formed integrally with a shaft 29 mounted for rotation relatively to plates 30 extending from the main frame 10, and forming part of that main frame.

Integrally with the shaft 29, there is secured a sprocket 31 which is in driven engagement with a chain 32, the chain 32 being in turn driven by a sprocket 33, shown in Fig. 2 to be mounted for rotation relatively to a pair of standards 34 welded to and forming part of the main frame.

For rotating the sprocket 33, there is utilized a pawl and ratchet mechanism of a reversible type, the detailed construction of which is not important to consider in this case. Suffice it to say, this mechanism is preferably actuated by a hand lever 36 so as to rotate the sprocket 33 in one direction or the other, and through the chain 32 to rotate the shaft 29 in one direction or the other. Depending, of course, upon the rotation of the shaft 29, the crank arms 28 through the links 26 and ears 25 move the battery compartment 16 from its full line position of Fig. 1 to its dash and dot position of Fig. 1 and back again.

It will be appreciated that when there is a heavy load on the forks 13, it is desirous to have the battery compartment 16 in its dash and dot position of Fig. 1, to which position it may be easily and quickly moved by operation of the hand lever 36 through the means just described. The load on the forks is now effectively counter balanced, as will be fully appreciated.

The steering wheels of my truck are designated by reference numeral 37 and, as best shown in Fig. 2, are each rotatable about a shaft 38. Each of the shafts 38 is carried in a pair of forks 39a which are part of a fork assembly 39 rotatable through the ball bearings 40 relatively to a plate 41 which I term a wheel supporting member or wheel supporting plate. The mounting details are clearly shown and need not be described to those familiar with this art. The left hand wheel fork assembly in Fig. 2 has secured thereto and for integral movement therewith, a sprocket 42, which is in driven engagement with a chain 43, it being obvious that when the chain rotates the sprocket 42, the fork assembly 39 will be rotated about the bearings 40 to steer the truck. The left hand wheel fork assembly 39 also has pivotally secured thereto a bar 44, shown best in Fig. 3, which in turn is pivotally secured at 45 to the right hand wheel fork assembly. It is thus obvious that if the left hand fork assembly and wheel is rotated, the right hand wheel fork assembly 39 and its wheel 37 is also rotated to steer the truck.

For operating the chain 43 to steer the truck, I utilize a rotatable sprocket 46 mounted on the main frame and in geared relation through its gear 46a with the gear 47 secured to the lower end of the steering shaft 48. It is obvious that when the steering shaft 48 is rotated by wheel 14, the gear 47 will, through its geared connection with the sprocket 46, rotate the sprocket and thereby drive the chain 43 to steer the truck, all as is quite apparent.

For taking up slack in the chain 43, I utilize a movable idler sprocket 49, best shown in Fig. 3. The shaft 50 on which the idler sprocket 49 is rotatable, is adjustably secured on the wheel supporting plate 41, being adapted for sliding movement relatively to the slot 51, best shown in Fig. 4. By simply loosening the nut 52, the shaft 50 carrying the idler sprocket 49 may be moved relatively to the slot 51 to a position in which the chain 43 is properly adjusted, whereupon a tightening of the nut 52 will secure the sprocket in its proper adjusted position.

The wheel supporting plate 41 is mounted for pivotal movement relatively to the main frame of the truck and, as was indicated previously, this mounting is arranged so as to stabilize the truck by broadening, in effect, the tread of the truck, that is, the effective distance between the two wheels 37. For this purpose, there is welded to the main frame plate 19 of the truck, an upper bearing block 53 having bearing portions 54 formed thereon for a pair of bearing shafts 55. The wheel supporting member or plate 41 has welded thereto a similar bearing block, termed a lower bearing block and designated by reference numeral 56. It also is equipped with bearing portions 57 cooperating with the bearing shafts 55.

Both bearing blocks are preferably equipped with spaced holes 58 in the longitudinal center of the truck, these holes being aligned for the passage of bolts 59, there being preferably three of these bolts in my construction. These bolts serve to maintain assembled the upper and lower bearing blocks 53 and 56, respectively, and therefore the main frame plate 19 of the truck and the wheel supporting plate 41. They are adapted, however, to allow separation of the bearing blocks, while resisting yieldingly said separation through the springs 60 which are mounted on the bolts 59 and are maintained thereon by the nuts 61. Rubber bumpers 62 are placed on plate 41 to limit its movement relatively to the main frame plate 19.

It will now be obvious, especially with reference to Fig. 2, that the wheel carrying plate 41 may pivot clockwise or counter-clockwise relatively to the main frame plate 19, and that this pivotal movement will take place about the axis of one or the other of the two bearing shafts 55. As a matter of fact, this pivotal movement will take place relatively to that bearing shaft which is furthest displaced from the particular wheel 37 which is moving away relatively to the main frame plate 19. This movement, as was already indicated, will of course be resisted by the three springs 60 mounted about the three bolts 59. In effect, this will serve to increase the effective tread of the truck by a considerable amount, thereby contributing considerably to the stability of the truck. This is of extreme importance, especially to a type of truck which I have shown in which the load is adapted to be elevated to a considerable degree. The increase in the effective tread of the truck serves the same purpose as the lowering of the center of gravity of the truck, all as will be understood and appreciated by those skilled in the art who will understand the problem involved and the rather simple means which I have conceived for solving that problem.

I now claim:

1. In a truck of the class described, a wheel supporting member, transversely spaced wheels mounted on said wheel supporting member and held against vertical movement relatively thereto, a main frame, an upper bearing member on the underside of said main frame and a lower bearing member on the upper side of said wheel supporting member, said bearing members having each a pair of spaced longitudinal grooves, the grooves in the said upper and lower bearing members being complementary, a pair of bearing shafts positioned to lie in the said bearing grooves and holding the said bearing members in spaced relation, said wheel supporting member being adapted to tilt with its bearing member relatively to one or the other of said shafts as though it were the only bearing shaft between the said wheel supporting member and said main frame.

2. In a truck of the class described, a wheel supporting member, transversely spaced wheels mounted on said wheel supporting member and held against vertical movement relatively thereto, a main frame, an upper bearing member on the underside of said main frame and a lower bearing member on the upper side of said wheel supporting member, said bearing members having each a pair of spaced longitudinal grooves, the grooves in the said upper and lower bearing members being complementary, a pair of bearing shafts positioned to lie in the said bearing grooves and holding the said bearing members in spaced relation, said wheel supporting member being adapted to tilt with its bearing member relatively to one or the other of said shafts as though it were the only bearing shaft between the said wheel supporting member and said main frame, and a spring resisting said tilting movement.

3. In a truck of the class described, a wheel supporting member, transversely spaced wheels mounted on said wheel supporting member and held against vertical movement relatively thereto, a main frame, an upper bearing member on the underside of said main frame and a lower bearing member on the upper side of said wheel supporting member, said bearing members having each a pair of spaced longitudinal grooves, the grooves in the said upper and lower bearing members being complementary, a pair of bearing shafts positioned to lie in the said bearing grooves and holding the said bearing members in spaced relation, said wheel supporting member being adapted to tilt with its bearing member relatively to one or the other of said shafts as though it were the only bearing shaft between the said wheel supporting member and said main frame, and spring means between said main frame and said wheel supporting member and positioned between said shafts for resisting tilting movement of said member relatively to said frame about either of said shafts.

4. In a truck of the class described, a wheel supporting member, transversely spaced wheels mounted on said wheel supporting member and held against vertical movement relatively thereto, a main frame, an upper bearing member on the underside of said main frame and a lower bearing member on the upper side of said wheel supporting member, said bearing members having each a pair of spaced longitudinal grooves, the grooves in the said upper and lower bearing members being complementary, a pair of bearing shafts positioned to lie in the said bearing grooves and holding the said bearing members in spaced relation, said wheel supporting member being adapted to tilt with its bearing member relatively to one or the other of said shafts as though it were the only bearing shaft between the said wheel supporting member and said main frame, a series of vertical bolts passing through openings in the longitudinal center of said bearing members and between said spaced shafts, and springs retained on said bolts and yieldingly resisting movement of said main frame relatively to said wheel supporting member about the axis of either of said shafts.

CHARLES S. SCHROEDER.